United States Patent
Yokochi et al.

(10) Patent No.: US 12,032,214 B2
(45) Date of Patent: Jul. 9, 2024

(54) OPTICAL COMMUNICATION SYSTEM

(71) Applicant: SUMITOMO ELECTRIC INDUSTRIES, LTD., Osaka (JP)

(72) Inventors: Takayuki Yokochi, Osaka (JP); Kenichiro Otsuka, Osaka (JP); Takayuki Shimazu, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 92 days.

(21) Appl. No.: 18/071,760

(22) Filed: Nov. 30, 2022

(65) Prior Publication Data

US 2023/0176299 A1 Jun. 8, 2023

(30) Foreign Application Priority Data

Dec. 3, 2021 (JP) ................................ 2021-197246

(51) Int. Cl.
*H04B 10/00* (2013.01)
*G02B 6/38* (2006.01)
*G02B 6/44* (2006.01)

(52) U.S. Cl.
CPC ......... *G02B 6/3897* (2013.01); *G02B 6/3887* (2013.01); *G02B 6/4452* (2013.01); *G02B 6/4471* (2013.01)

(58) Field of Classification Search
CPC .. G02B 6/4452; G02B 6/4471; G02B 6/3887; G02B 6/3897
See application file for complete search history.

(56) References Cited

U.S. PATENT DOCUMENTS

| | | | | |
|---|---|---|---|---|
| 5,788,087 A | * | 8/1998 | Orlando | H04Q 1/13 211/26 |
| 6,250,816 B1 | * | 6/2001 | Johnston | G02B 6/4452 385/53 |
| 6,359,789 B1 | * | 3/2002 | Imabayashi | G02B 6/4452 361/801 |
| 6,504,094 B2 | * | 1/2003 | Woo | H04Q 1/066 174/58 |

(Continued)

FOREIGN PATENT DOCUMENTS

| | | |
|---|---|---|
| JP | 2001-51131 A | 2/2001 |
| JP | 2001-116968 A | 4/2001 |

(Continued)

*Primary Examiner* — Agustin Bello
(74) *Attorney, Agent, or Firm* — Oliff PLC

(57) ABSTRACT

An optical communication system comprises N server racks, first and second distribution frames, and first and second optical fiber cables. Each of the first and second optical fiber cables has N optical connector groups for racks and an optical connector group for distribution frame including M optical connectors. The closer the number of an optical connector of the M optical connectors is to the last number, the longer a wiring distance from the optical connector group for distribution frame to a corresponding optical connector group of the N optical connector groups for racks in the first optical fiber cable. The closer the number of an optical connector of the M optical connectors is to the last number, the shorter a wiring distance from the optical connector group for distribution frame to a corresponding optical connector group of the N optical connector groups for racks in the second optical fiber cable.

13 Claims, 10 Drawing Sheets

(56) References Cited

U.S. PATENT DOCUMENTS

| | | | |
|---|---|---|---|
| 6,556,763 B1* | 4/2003 | Puetz | G02B 6/4454 |
| | | | 385/134 |
| 7,127,143 B2 | 10/2006 | Elkins, II et al. | |
| 7,346,243 B2 | 3/2008 | Cody et al. | |
| 7,693,374 B2 | 4/2010 | Cody et al. | |
| 8,070,112 B2* | 12/2011 | Smrha | H02G 3/0437 |
| | | | 248/89 |
| 8,582,938 B2 | 11/2013 | Cody et al. | |
| 8,989,547 B2* | 3/2015 | Brower | G02B 6/44526 |
| | | | 385/134 |
| 9,042,699 B2* | 5/2015 | Barry | G02B 6/3542 |
| | | | 439/502 |
| 9,645,317 B2* | 5/2017 | Isenhour | G02B 6/4447 |
| 10,048,452 B1* | 8/2018 | Hangebrauck | G02B 6/4471 |
| 10,371,917 B2 | 8/2019 | Cooke et al. | |
| 10,437,003 B2 | 10/2019 | Jensen et al. | |
| 10,712,519 B2 | 7/2020 | Faulkner et al. | |
| 2002/0043226 A1 | 4/2002 | Gofron | |
| 2004/0074852 A1* | 4/2004 | Knudsen | G02B 6/4478 |
| | | | 211/26 |
| 2005/0002633 A1* | 1/2005 | Solheid | G02B 6/4446 |
| | | | 385/135 |
| 2009/0016043 A1* | 1/2009 | Hruby | G02B 6/44524 |
| | | | 174/72 A |
| 2010/0189403 A1* | 7/2010 | Keith | G02B 6/4452 |
| | | | 385/135 |
| 2010/0220953 A1* | 9/2010 | Kewitsch | G02B 6/3502 |
| | | | 385/17 |
| 2012/0301083 A1* | 11/2012 | Carter | G02B 6/4471 |
| | | | 211/13.1 |
| 2013/0034336 A1* | 2/2013 | Cassell | G02B 6/475 |
| | | | 254/134.3 R |
| 2013/0308908 A1* | 11/2013 | Isenhour | G02B 6/44524 |
| | | | 264/1.25 |
| 2014/0093217 A1* | 4/2014 | Lu | G02B 6/44 |
| | | | 385/136 |
| 2020/0163242 A1* | 5/2020 | Leigh | H05K 5/0026 |
| 2021/0191059 A1* | 6/2021 | Bolster | G02B 6/4471 |
| 2022/0075122 A1* | 3/2022 | Schiffbauer | G02B 6/3897 |
| 2022/0357542 A1* | 11/2022 | Cooke | G02B 6/4475 |
| 2023/0176299 A1* | 6/2023 | Yokochi | G02B 6/3897 |
| | | | 385/89 |
| 2023/0176307 A1* | 6/2023 | Yokochi | G02B 6/4447 |
| | | | 385/114 |
| 2024/0022327 A1* | 1/2024 | Williams | H04B 10/271 |

FOREIGN PATENT DOCUMENTS

| | | |
|---|---|---|
| JP | 2001-201641 A | 7/2001 |
| JP | 2005-208193 A | 8/2005 |
| JP | 2005-208196 A | 8/2005 |

\* cited by examiner

OPTICAL COMMUNICATION SYSTEM

CROSS-REFERENCE TO RELATED APPLICATION

This application is based upon and claims the benefit of the priority from Japanese Patent Application No. 2021-197246, filed on Dec. 3, 2021, the entire contents of which are incorporated herein by reference.

TECHNICAL FIELD

The present disclosure relates to an optical communication system.

BACKGROUND

Japanese Unexamined Patent Publication Nos. 2001-51131, 2001-116968, and 2001-201641 and U.S. Pat. Nos. 7,127,143, 7,346,243, 7,693,374, 8,582,938, 10,437,003, and 10,712,519 disclose various optical fiber cables used for optical communication. Japanese Unexamined Patent Publication No. 2005-208193 discloses an optical microbox that connects a branch cable branched from an optical trunk cable and a termination cable to each other. U.S. Pat. No. 10,371,917 discloses a data center including optical fibers and the like.

SUMMARY

The present disclosure provides an optical communication system. An optical communication system includes: a server rack group in which N (N is an integer of 2 or more) server racks numbered in ascending order are arranged side by side in order; a first distribution frame arranged on a side of a first server rack of the server rack group in an arrangement direction of the N server racks; a second distribution frame arranged on a side of a last server rack of the server rack group in the arrangement direction of the N server racks; a first optical fiber cable that interconnects the server rack group and the first distribution frame; and a second optical fiber cable that interconnects the server rack group and the second distribution frame. The first optical fiber cable has an optical connector group for distribution frame including M (M is an integer of 2 or more) optical connectors for distribution frame, which are connected to the first distribution frame and numbered in ascending order, and N optical connector groups for racks each of which includes at least one optical connector for racks, is connected to a device installed in each of the N server racks, and is numbered in ascending order so as to match a direction of numbering of the N server racks. The second optical fiber cable has an optical connector group for distribution frame including M optical connectors for distribution frame, which are connected to the second distribution frame and numbered in ascending order, and N optical connector groups for racks each of which includes at least one optical connector for racks, is connected to a device installed in each of the N server racks, and is numbered in ascending order so as to match the direction of numbering of the N server racks. In a correspondence relationship between the M optical connectors for distribution frame and the N optical connector groups for racks of the first optical fiber cable and the second optical fiber cable, the closer the number of an optical connector group of the N optical connector groups for racks is to a first number, the closer the number of a corresponding optical connector of the M optical connectors for distribution frame is to the first number, and the closer the number of an optical connector group of the N optical connector groups for racks is to a last number, the closer the number of a corresponding optical connector of the M optical connectors for distribution frame is to the last number. The closer the number of an optical connector of the M optical connectors for distribution frame is to the last number, the longer a wiring distance from the optical connector group for distribution frame to a corresponding optical connector group of the N optical connector groups for racks in the first optical fiber cable. The closer the number of an optical connector of the M optical connectors for distribution frame is to the last number, the shorter a wiring distance from the optical connector group for distribution frame to a corresponding optical connector group of the N optical connector groups for racks in the second optical fiber cable.

The present disclosure provides an optical communication system. An optical communication system includes: a server rack group in which N (N is an integer of 2 or more) server racks numbered in ascending order are arranged side by side in order; a first distribution frame and a second distribution frame arranged on one side of the server rack group in an arrangement direction of the N server racks; a first optical fiber cable that interconnects the server rack group and the first distribution frame; and a second optical fiber cable that interconnects the server rack group and the second distribution frame. The first optical fiber cable has an optical connector group for distribution frame including M (M is an integer of 2 or more) optical connectors for distribution frame, which are connected to the first distribution frame and numbered in ascending order, and N optical connector groups for racks each of which includes at least one optical connector for racks, is connected to a device installed in each of the N server racks, and is numbered in ascending order so as to match a direction of numbering of the N server racks. The second optical fiber cable has an optical connector group for distribution frame including M optical connectors for distribution frame, which are connected to the second distribution frame and numbered in ascending order, and N optical connector groups for racks each of which includes at least one optical connector for racks, is connected to a device installed in each of the N server racks, and is numbered in ascending order so as to match the direction of numbering of the N server racks. In a correspondence relationship between the M optical connectors for distribution frame and the N optical connector groups for racks of the first optical fiber cable and the second optical fiber cable, the closer the number of an optical connector group of the N optical connector groups for racks is to a first number, the closer the number of a corresponding optical connector of the M optical connectors for distribution frame is to the first number, and the closer the number of an optical connector group of the N optical connector groups for racks is to a last number, the closer the number of a corresponding optical connector of the M optical connectors for distribution frame is to the last number. The closer the number of an optical connector of the M optical connectors for distribution frame is to the last number, the longer a wiring distance from the optical connector group for distribution frame to a corresponding optical connector group of the N optical connector groups for racks in the first optical fiber cable and the second optical fiber cable, or the closer the number of an optical connector of the M optical connectors for distribution frame is to the last number, the shorter the wiring distance from the optical connector group for distribution frame to a corresponding optical connector group of the N optical connector groups for racks in the first optical fiber cable and the second optical fiber cable.

DETAILED DESCRIPTION

Figure 1:
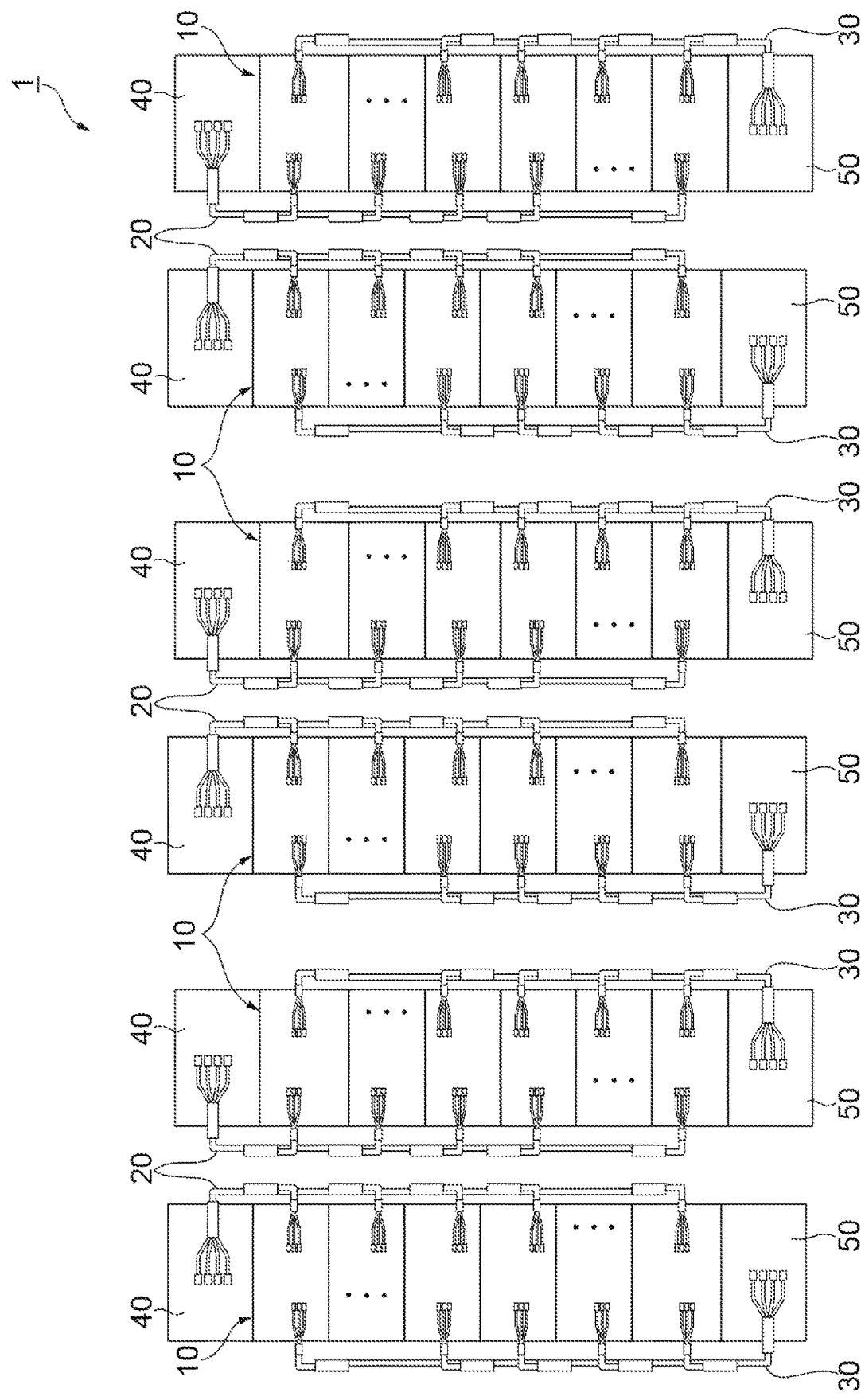
FIG. 1 is a schematic plan view of an optical communication system according to a first embodiment.

Problems to be Solved by the Present Disclosure

In a data center or the like, a plurality of server racks are arranged side by side, and the server racks and an intermediate distribution frame (IDF) are interconnected through optical fiber cables. In many cases, two or more server rack groups, each of which includes a plurality of server racks aligned in a predetermined direction, are arranged side by side at intervals therebetween in a direction crossing the predetermined direction. In addition, the intermediate distribution frame is arranged on one side (or both sides) of each server rack group in the predetermined direction. Therefore, the distance from the intermediate distribution frame to each server rack in the server rack group differs for each server rack. For this reason, the optical fiber cable extending from the intermediate distribution frame to the server rack group has a plurality of branches to the respective server racks. When the number of optical fibers included in the optical fiber cable is large, a plurality of optical connectors are provided on the intermediate distribution frame side of the optical fiber cable.

In such a facility, at least two intermediate distribution frames may be connected to one server rack group. For example, one intermediate distribution frame is used as a working line and connected to the server rack group through the optical fiber cable. Another intermediate distribution frame is used as a spare line and is connected to the server rack group through another optical fiber cable. In such a case, it is difficult to understand the correspondence relationship between a plurality of optical connectors on the intermediate distribution frame side of the optical fiber cable and a plurality of server racks. Therefore, the work becomes complicated.

Effects of the Present Disclosure

According to the optical communication system according to the present disclosure, since it is possible to easily understand the correspondence relationship between a plurality of optical connectors on the intermediate distribution frame side of the optical fiber cable and a plurality of server racks, it is possible to reduce the complexity of connecting the optical fiber cable.

Description of Embodiments of the Present Disclosure

First, embodiments of the present disclosure will be listed and described.

An embodiment is an optical communication system including: a server rack group in which N (N is an integer of 2 or more) server racks numbered in ascending order are arranged side by side in order; a first distribution frame arranged on a side of a first server rack of the server rack group in an arrangement direction of the N server racks; a second distribution frame arranged on a side of a last server rack of the server rack group in the arrangement direction of the N server racks; a first optical fiber cable that interconnects the server rack group and the first distribution frame; and a second optical fiber cable that interconnects the server rack group and the second distribution frame. The first optical fiber cable has an optical connector group for distribution frame including M (M is an integer of 2 or more) optical connectors for distribution frame, which are connected to the first distribution frame and numbered in ascending order, and N optical connector groups for racks each of which includes at least one optical connector for racks, is connected to a device installed in each of the N server racks, and is numbered in ascending order so as to match a direction of numbering of the N server racks. The second optical fiber cable has an optical connector group for distribution frame including M optical connectors for distribution frame, which are connected to the second distribution frame and numbered in ascending order, and N optical connector groups for racks each of which includes at least one optical connector for racks, is connected to a device installed in each of the N server racks, and is numbered in ascending order so as to match the direction of numbering of the N server racks. In a correspondence relationship between the M optical connectors for distribution frame and the N optical connector groups for racks of the first optical fiber cable and the second optical fiber cable, the closer the number of an optical connector group of the N optical connector groups for racks is to a first number, the closer the number of a corresponding optical connector of the M optical connectors for distribution frame is to the first number, and the closer the number of an optical connector group of the N optical connector groups for racks is to a last number, the closer the number of a corresponding optical connector of the M optical connectors for distribution frame is to the last number. The closer the number of an optical connector of the M optical connectors for distribution frame is to the last number, the longer a wiring distance from the optical connector group for distribution frame to a corresponding optical connector group of the N optical connector groups for racks in the first optical fiber cable. The closer the number of an optical connector of the M optical connectors for distribution frame is to the last number, the shorter a wiring distance from the optical connector group for distribution frame to a corresponding optical connector group of the N optical connector groups for racks in the second optical fiber cable.

Another embodiment is an optical communication system including: a server rack group in which N (N is an integer of 2 or more) server racks numbered in ascending order are arranged side by side in order; a first distribution frame and a second distribution frame arranged on one side of the server rack group in an arrangement direction of the N server racks; a first optical fiber cable that interconnects the server rack group and the first distribution frame; and a second optical fiber cable that interconnects the server rack group and the second distribution frame. The first optical fiber cable has an optical connector group for distribution frame including M (M is an integer of 2 or more) optical connectors for distribution frame, which are connected to the first distribution frame and numbered in ascending order, and N optical connector groups for racks each of which includes at least one optical connector for racks, is connected to a device installed in each of the N server racks, and is numbered in ascending order so as to match a direction of numbering of the N server racks. The second optical fiber cable has an optical connector group for distribution frame including M optical connectors for distribution frame, which are connected to the second distribution frame and numbered in ascending order, and N optical connector groups for racks each of which includes at least one optical connector for racks, is connected to a device installed in each of the N server racks, and is numbered in ascending order so as to match the direction of numbering of the N server racks. In a correspondence relationship between the M optical connectors for distribution frame and the N optical connector groups for racks of the first optical fiber cable and the second optical fiber cable, the closer the number of an optical connector group of the N optical connector groups for racks is to a first number, the closer the number of a corresponding optical connector of the M optical connectors for distribution frame is to the first number, and the closer the number of an optical connector group of the N optical connector groups for racks is to a last number, the closer the number of a corresponding optical connector of the M optical connectors for distribution frame is to the last number. The closer the number of an optical connector of the M optical connectors for distribution frame is to the last number, the longer a wiring distance from the optical connector group for distribution frame to a corresponding optical connector group of the N optical connector groups for racks in the first optical fiber cable and the second optical fiber cable, or the closer the number of an optical connector of the M optical connectors for distribution frame is to the last number, the shorter the wiring distance from the optical connector group for distribution frame to a corresponding optical connector group of the N optical connector groups for racks in the first optical fiber cable and the second optical fiber cable.

In each of the optical communication systems described above, in the two optical fiber cables, the direction of ascending numbering of the optical connector groups for racks and the direction of ascending numbering of the server racks are the same. In addition, the closer the number of the optical connector group of the N optical connector groups for racks is to the first number, the closer the number of the corresponding optical connector of the M optical connectors for distribution frame is to the first number, and the closer the number of the optical connector group of the N optical connector groups for racks is to the last number, the closer the number of the corresponding optical connector of the M optical connectors for distribution frame is to the last number. With such a configuration, it is possible to easily understand the correspondence relationship between the plurality of optical connectors (optical connectors for distribution frame) of the optical fiber cable on the intermediate distribution frame side and the plurality of server racks. Therefore, it is possible to reduce the complexity of connecting the optical fiber cables.

In the optical communication system according to the first embodiment, preferably, the closer the number of the optical connector group of the N optical connector groups for racks is to the last number, the longer the wiring distance from the optical connector group for distribution frame to the optical connector group of the N optical connector groups for racks in the first optical fiber cable, and the closer the number of the optical connector group of the N optical connector groups for racks is to the last number, the shorter the wiring distance from the optical connector group for distribution frame to the optical connector group of the N optical connector groups for racks in the second optical fiber cable.

In the optical communication system according to the second embodiment, preferably, the closer the number of the optical connector of the M optical connectors for distribution frame is to the last number, the longer the wiring distance from the optical connector group for distribution frame to the optical connector group of the N optical connector groups for racks in the first optical fiber cable and the second optical fiber cable, and the closer the number of the optical connector group of the N optical connector groups for racks is to the last number, the longer the wiring distance from the optical connector group for distribution frame to the optical connector group of the N optical connector groups for racks in the first optical fiber cable and the second optical fiber cable.

In the optical communication system according to the second embodiment, preferably, the closer the number of the optical connector of the M optical connectors for distribution frame is to the last number, the shorter the wiring distance from the optical connector group for distribution frame to the optical connector group of the N optical connector groups for racks in the first optical fiber cable and the second optical fiber cable, and the closer the number of the optical connector group of the N optical connector groups for racks is to the last number, the shorter the wiring distance from the optical connector group for distribution frame to the optical connector group of the N optical connector groups for racks in the first optical fiber cable and the second optical fiber cable.

In each optical communication system described above, the first optical fiber cable and the second optical fiber cable may be configured separately from each other. In this case, it is possible to more easily distinguish to which of the first distribution frame and the second distribution frame the optical fiber cable should be connected.

Details of Embodiments of the Present Disclosure

Specific examples of an optical communication system according to an embodiment of the present disclosure will be described below with reference to the drawings. The present invention is not limited to the examples, but is indicated by the appended claims and is intended to include all modifications within the meaning and scope equivalent to the appended claims. In the following description, the same elements will be designated by the same reference numerals in the description of the drawings, and redundant description will be omitted.

First Embodiment

Figure 2:
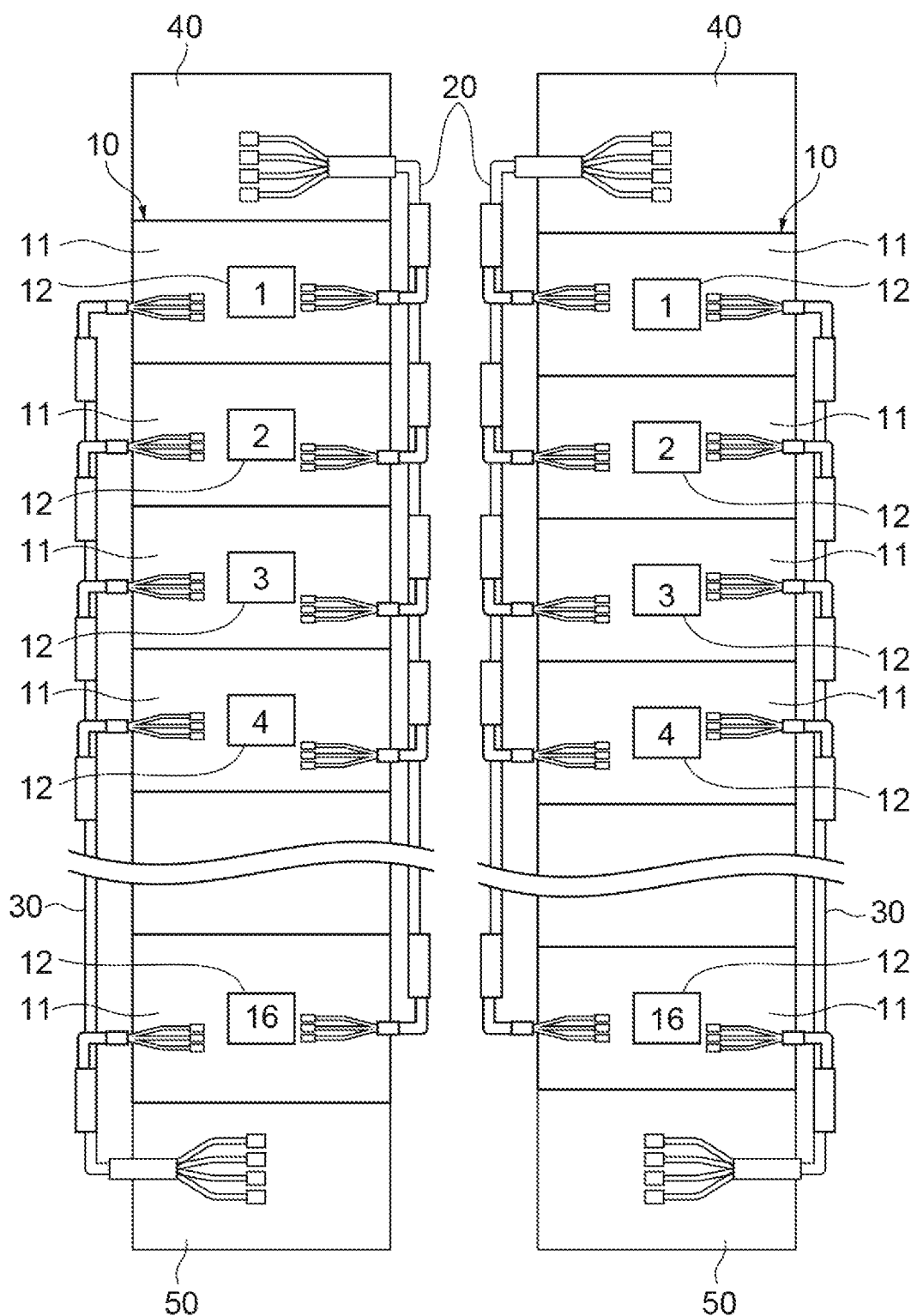
FIG. 2 is an enlarged view of a part of FIG. 1.

FIG. 1 is a schematic plan view of an optical communication system 1 according to a first embodiment. FIG. 2 is an enlarged view of a part of FIG. 1. The optical communication system 1 is a group of devices provided in a data center, a base station, or the like. The optical communication system 1 includes at least one server rack group 10, at least one working optical fiber cable 20 (first optical fiber cable), at least one spare optical fiber cable 30 (second optical fiber cable), at least one working distribution frame 40 (first distribution frame), and at least one spare distribution frame 50 (second distribution frame). FIG. 1 shows six server rack groups 10, six working optical fiber cables 20, six spare optical fiber cables 30, six working distribution frames 40, and six spare distribution frames 50. However, these numbers are not limited thereto.

As shown in FIG. 2, in the server rack group 10, N (N is an integer of 2 or more; FIG. 2 shows a case of N=16) server racks 11 are arranged side by side in order in a predetermined direction. When a plurality of server rack groups 10 are provided, the arrangement directions of the server racks 11 in the server rack groups 10 are the same. A plurality of shelves aligned vertically are provided in each server rack 11. A physical server or the like is placed on each of the plurality of shelves. In each server rack group 10, each of the N server racks 11 is numbered with a label 12 attached thereto. The label 12 includes numbers, alphabets, and other letters or symbols. The letters or symbols on the label 12 are limited to those having ascending order. The label 12 is assigned in ascending order from one end side of the array of the server racks 11. In the present embodiment, as an example, the labels 12 are assigned with numbers ("1", "2", "3", ...) sequentially from the server rack 11 located on one end side of the working distribution frame 40. The first label 12 may not necessarily be the first number or letter ("1", "a", or the like). Numbers may not be sequential.

Each of the working distribution frame 40 and the spare distribution frame 50 is a line concentrator in which communication lines (optical fiber cables) used in the optical communication system 1 are housed, and is also referred to as an intermediate distribution frame (IDF). An external multi-core cable forming a working line is connected to the working distribution frame 40, and the external multi-core cable is divided and arranged into a plurality of communication lines in the working distribution frame 40. An external multi-core cable forming a spare line is connected to the spare distribution frame 50, and the external multi-core cable is divided and arranged into a plurality of communication lines in the spare distribution frame 50. In the working distribution frame 40 and the spare distribution frame 50, the optical fiber cable may be terminated. On the working distribution frame 40 and the spare distribution frame 50, a termination unit for anchoring multi-core optical wirings and housing the connection points can be placed. The working distribution frame 40 and the spare distribution frame 50 are not limited to intermediate distribution frames.

The working distribution frame 40 is arranged on a side of the first server rack 11 of the server rack group 10 in the arrangement direction of the N server racks 11. The spare distribution frame 50 is arranged on a side of the last server rack 11 of the server rack group 10 in the arrangement direction of the N server racks 11. In other words, the working distribution frame 40 and the spare distribution frame 50 are arranged side by side in the arrangement direction of the N server racks 11, and the server rack group 10 is located between the working distribution frame 40 and the spare distribution frame 50 in the arrangement direction of the N server racks 11.

The working optical fiber cable 20 is a multi-core optical cable for interconnecting the server rack group 10 and the working distribution frame 40. The spare optical fiber cable 30 is a multi-core optical cable for interconnecting the server rack group 10 and the spare distribution frame 50. The working optical fiber cable 20 is configured to be detachable from the server rack group 10 and the working distribution frame 40. The spare optical fiber cable 30 is configured to be detachable from the server rack group 10 and the spare distribution frame 50. The working optical fiber cable 20 and the spare optical fiber cable 30 are not integrated, but are configured separately from each other.

Figure 3:
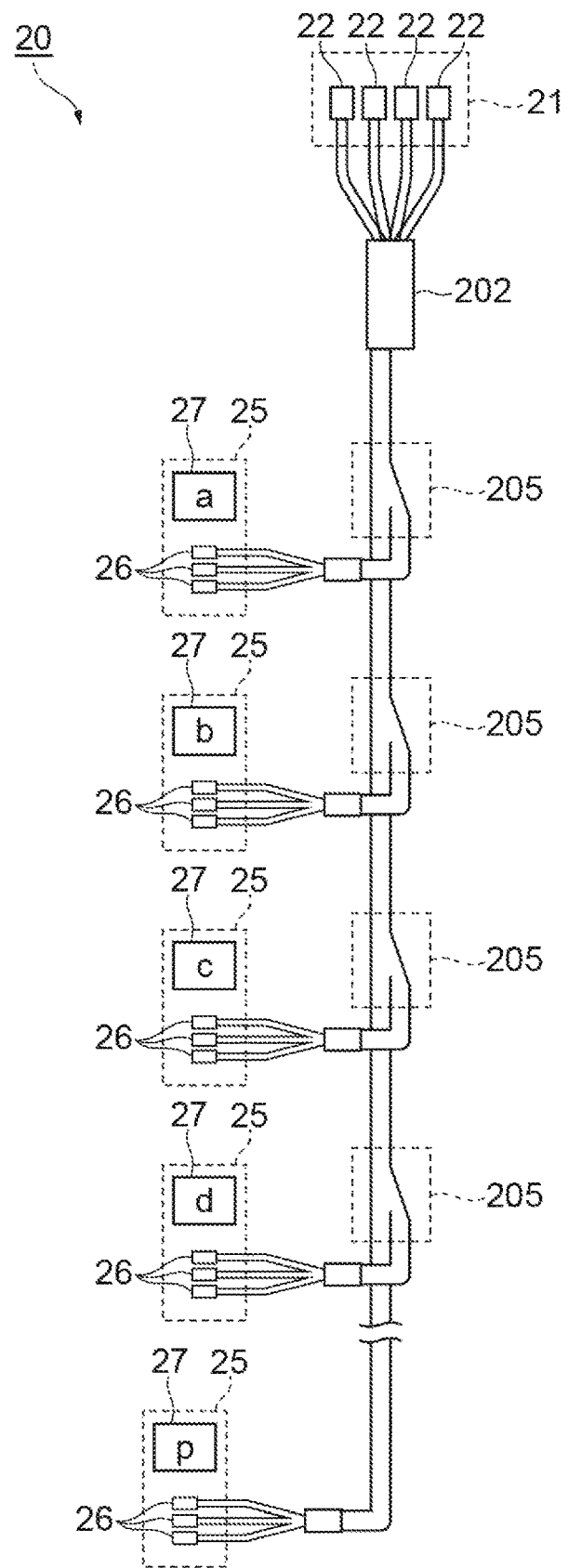
FIG. 3 is a schematic plan view of a main part of a working optical fiber cable.

FIG. 3 is a schematic plan view of a main part of the working optical fiber cable 20. As shown in FIG. 3, the working optical fiber cable 20 has an optical connector group 21 for distribution frame and N optical connector groups 25 for racks. The optical connector group 21 for distribution frame includes M (M is an integer of 2 or more; FIG. 3 shows a case of N=4) optical connectors 22 for distribution frame, and the M optical connectors 22 connected to the working distribution frame 40. The optical connector 22 is a multi-core optical connector, for example, an MPO connector. Each optical connector 22 has, for example, 24 cores.

Figure 4:
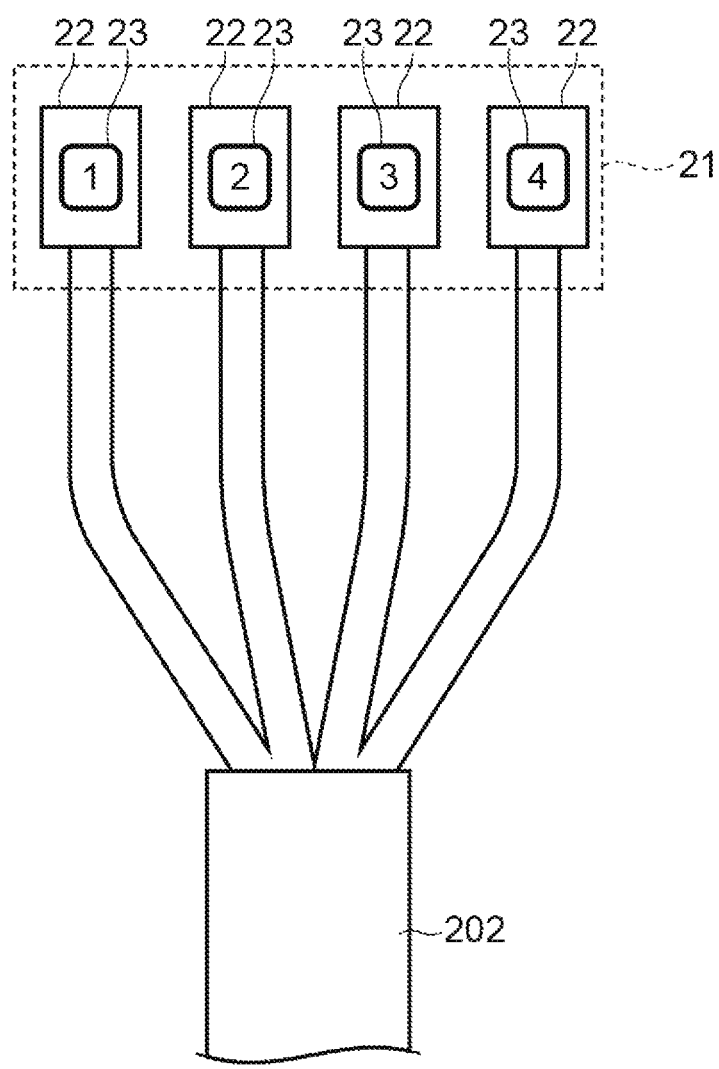
FIG. 4 is an enlarged plan view showing M optical connectors for distribution frame.

FIG. 4 is an enlarged plan view showing M optical connectors 22. Each of the M optical connectors 22 is numbered with a label 23 attached thereto. The label 23 includes numbers, alphabets, and other letters or symbols. Similarly to the label 12 of the server rack 11, the letters or symbols on the label 23 are also limited to those having ascending order. For example, the label 23 is assigned in ascending order from one end side of working distribution frame 40 in the horizontal direction. In the present embodiment, as an example, the labels 23 are assigned with numbers ("1", "2", "3", ...) sequentially from the optical connector 22 located on one end side in the horizontal direction. The first label 23 may not necessarily be the first number or letter ("1", "a", or the like). Numbers may not be sequential.

FIG. 3 is referred to again. Each of the N optical connector groups 25 for racks includes at least one optical connector 26 for rack (FIG. 3 shows a case of three optical connectors 26). The optical connector 26 is a multi-core or single-core optical connector, for example, a dual LC type optical connector in which single-core LC type optical connectors are simply integrated. The number of cores of optical fibers connected to one optical connector 26 is less than the number of cores of optical fibers connected to one optical connector 22, for example, one, and the number of cores of optical fibers connected to one dual LC type optical connector is two. Each of the N optical connector groups 25 for racks is connected to a device installed in each of the N server racks 11.

Each of the N optical connector groups 25 for racks is numbered with a label 27 attached thereto. Similarly to the other numbering, the label 27 includes numbers, alphabets, and other letters or symbols. The letters or symbols on the label 27 are also limited to those having ascending order. The label 27 is assigned in ascending order from one end side of the array of the server racks 11 so as to match the direction of the ascending order of the labels 12 of the N server racks 11. In the present embodiment, as an example, the labels 27 are assigned with lowercase letters ("a", "b", "c", ...) sequentially from the optical connector group 25 for rack located on one end side of the working distribution frame 40. The first label 27 may not necessarily be the first number or letter ("1", "a", or the like). There may be no number in the middle.

Figure 5:
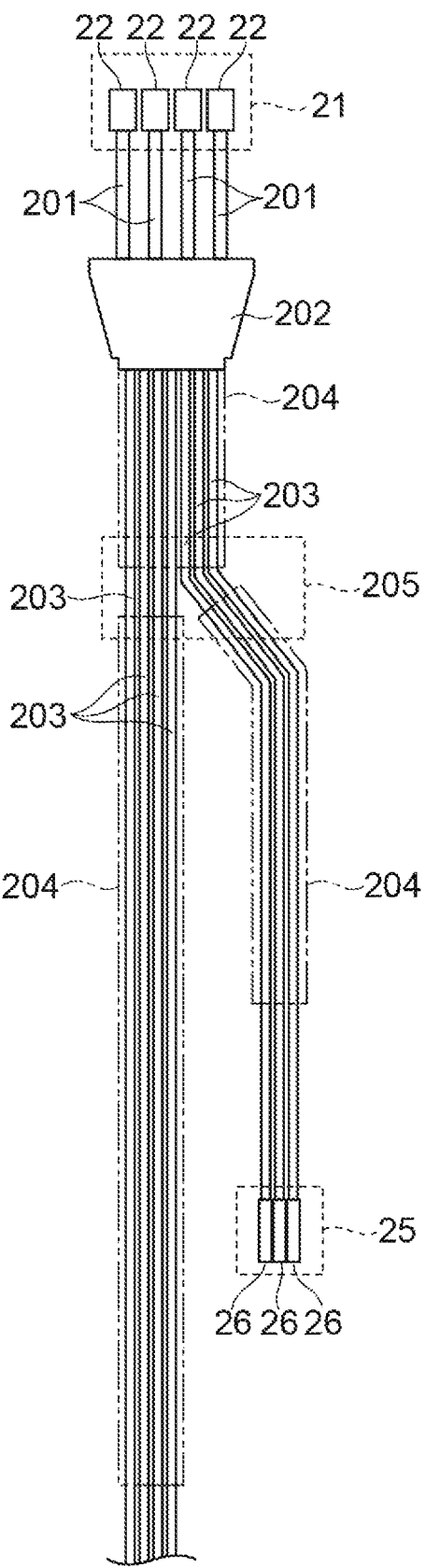
FIG. 5 is an enlarged plan view showing a part of a working optical fiber cable.

FIG. 5 is an enlarged plan view showing a part of the working optical fiber cable 20. FIG. 5 shows a part of the working optical fiber cable 20 including the optical connector group 21 for distribution frame and the first optical connector group 25 for rack. P (P is an integer of 2 or more; P=24 in one example) optical fibers extending from one optical connector 22 extend to a branch portion 202 while being protected by a reinforcing tube 201. The label 23 described above may be directly attached to the optical connector 22, or may be attached to the reinforcing tube 201 extending from the optical connector 22. These optical fibers are grouped into (P/Q) optical fiber cords 203 of Q cores (Q is an integer of 2 or more; Q=2 in one example) at the branch portion 202, and the optical fiber cords 203 extend from the branch portion 202 to a side opposite to the optical connector group 25 for rack. The optical fiber cord 203 is, for example, a two-core round cord. All the optical fiber cords 203 extending from the branch portion 202 are protected by a mesh tube 204 and kept bundled. By the mesh tube 204, damage to the optical fiber cord 203 can be suppressed.

The mesh tube 204 is discontinued at a branch portion 205. Some of the optical fiber cords 203 are branched toward the optical connector group 25 for rack at the branch portion 205. When the number of optical connectors 26 forming the optical connector group 25 for rack is three, the number of branched optical fiber cords 203 is also three. Corresponding optical connectors 26 are attached to the distal ends of the optical fiber cords 203. The optical fiber cord 203 between the branch portion 205 and the optical connector 26 and the remaining branched optical fiber cord 203 are protected by the separate mesh tubes 204. As shown in FIG. 3, the branch portion 205 is provided at (N–1) locations corresponding to (N–1) optical connector groups 25 for racks. The label 27 described above may be directly attached to the optical connector group 25 for rack, or may be attached to the mesh tube 204 between the branch portion 205 and the optical connector group 25 for rack.

Figure 6:
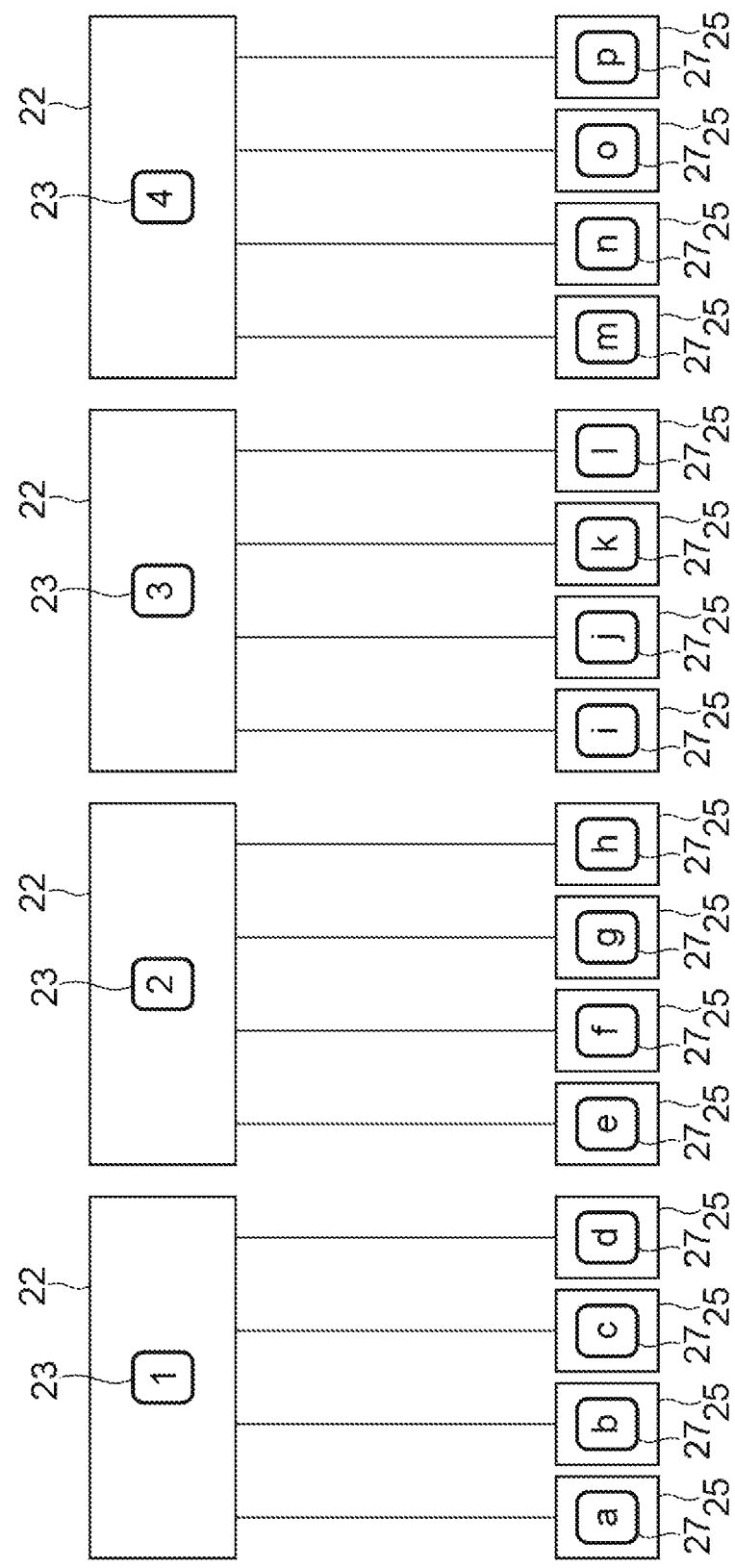
FIG. 6 is a diagram for explaining the correspondence relationship between M optical connectors for distribution frame and N optical connector groups for racks.

Here, FIG. 6 is a diagram for explaining an example of the correspondence relationship between the M optical connectors 22 and the N optical connector groups 25 for racks. In the present embodiment, the closer the label 27 of the optical connector group 25 for rack is to the first number, the closer the label 23 of the corresponding optical connector 22 is to the first number, and the closer the label 27 of the optical connector group 25 for rack is to the last number, the closer the label 23 of the corresponding optical connector 22 is to the last number. In the example shown in FIG. 6, the other end of the optical fiber whose one end is attached to the optical connector group 25 for rack whose label 27 is any one of "a" to "d" is attached to the optical connector 22 whose label 23 is "1". The other end of the optical fiber whose one end is attached to the optical connector group 25 for rack whose label 27 is any one of "e" to "h" is attached to the optical connector 22 whose label 23 is "2". Thereafter, in this example, the N optical connector groups 25 for racks are associated with the M optical connectors 22 so that one optical connector 22 corresponds to every four optical connector groups 25 for racks.

In the present embodiment, the working distribution frame 40 is arranged on the first server rack 11 side in the arrangement direction of the N server racks 11. Therefore, the closer the label 23 of the optical connector 22 for distribution frame is to the first number "1", the shorter the wiring distance from the optical connector group 21 for distribution frame to the corresponding optical connector group 25 for rack in the working optical fiber cable 20, and the closer the label 23 of the optical connector 22 for distribution frame is to the last number "4", the longer the wiring distance from the optical connector group 21 for distribution frame to the corresponding optical connector group 25 for rack in the working optical fiber cable 20. The wiring distances of the four optical connector groups 25 for racks connected to the same optical connector 22 for distribution frame may be the same or different. Typically, as shown in FIG. 3, the closer the label 27 of the optical connector group 25 for rack is to the first number "a", the shorter the wiring distance from the optical connector group 21 for distribution frame to the corresponding optical connector group 25 for rack in the working optical fiber cable 20, and the closer the label 27 of the optical connector group 25 for rack is to the last number "p", the longer the wiring distance from the optical connector group 21 for distribution frame to the corresponding optical connector group 25 for rack in the working optical fiber cable 20. That is, the length of the optical fiber between the optical connector group 25 for rack whose label 27 is the first number "a" and the optical connector group 21 for distribution frame is the smallest, and the length of the optical fiber between the optical connector group 25 for rack whose label 27 is the last number "p" and the optical connector group 21 for distribution frame is the largest.

Figure 7:
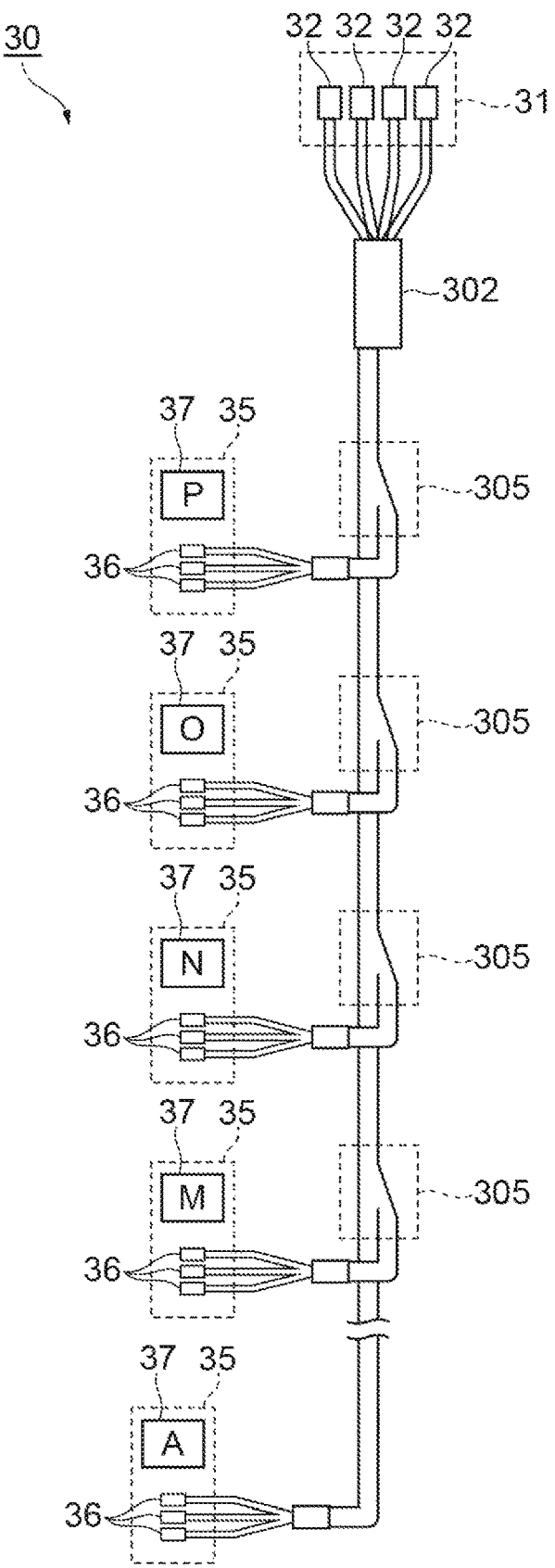
FIG. 7 is a schematic plan view of a main part of a spare optical fiber cable.

FIG. 7 is a schematic plan view of a main part of the spare optical fiber cable 30. As shown in FIG. 7, the spare optical fiber cable 30 has an optical connector group 31 for distribution frame and N optical connector groups 35 for racks. The optical connector group 31 for distribution frame includes M (FIG. 7 shows a case of N=4) for distribution frameoptical connectors 32 for distribution frame connected to the spare distribution frame 50. The optical connector 32 has the same configuration as the optical connector 22 described above.

Figure 8:
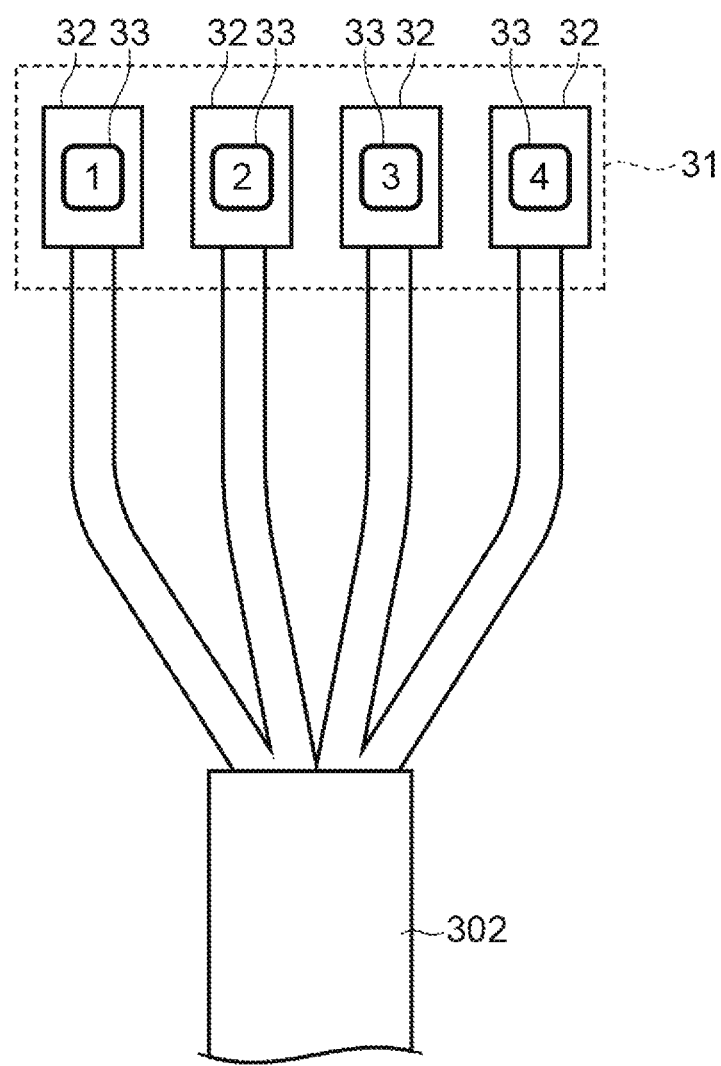
FIG. 8 is a diagram showing that each of M optical connectors for distribution frame is numbered with a label attached thereto.

As shown in FIG. 8, each of the M optical connectors 32 is numbered with a label 33 attached thereto. The contents and rules of the label are the same as the label 23 of the optical connector 22.

Each of the N optical connector groups 35 for racks includes at least one optical connector 36 for rack (FIG. 7 shows a case of three optical connectors 36). The configuration of the optical connector 36 is the same as the configuration of the optical connector 26 described above. Each of the N optical connector groups 35 for racks is connected to a device installed in each of the N server racks 11 from the side opposite to the optical connector group 25 for rack. Each of the N optical connector groups 35 for racks is numbered with a label 37 attached thereto. Similarly to the other numbering, the label 37 includes numbers, alphabets, and other letters or symbols. The letters or symbols on the label 37 are also limited to those having ascending order. The label 37 is assigned in ascending order from one end side of the array of the server racks 11 so as to match the direction of the ascending order of the labels 12 of the N server racks 11. In the present embodiment, as an example, the labels 37 are assigned with capital letters ("A", "B", "C", . . . ) sequentially from the optical connector group 35 for rack located on one end side of the working distribution frame 40. The first label 37 may not necessarily be the first number or letter ("1", "A", or the like). There may be no number in the middle.

In the spare optical fiber cable 30, similarly to the working optical fiber cable 20, P (P=24 in one example) optical fibers extending from one optical connector 32 extend to a branch portion 302 while being protected by a reinforcing tube. The label of the optical connector 32 may be directly attached to the optical connector 32, or may be attached to the reinforcing tube extending from the optical connector 32. These optical fibers are grouped into (P/Q) optical fiber cords of Q cores (Q is an integer of 2 or more; Q=2 in one example) at the branch portion 302. All the optical fiber cords extending from the branch portion 302 are protected by a mesh tube and kept bundled.

Some of the optical fiber cords are branched toward the optical connector group 35 for rack at the branch portion 305. When the number of optical connectors 36 forming the optical connector group 35 for rack is three, the number of branched optical fiber cords is also three. Corresponding optical connectors 36 are attached to the distal ends of the optical fiber cords. The optical fiber cord between the branch portion 305 and the optical connector 36 and the remaining branched optical fiber cord are protected by the separate mesh tubes. As shown in FIG. 7, the branch portion 305 is provided at (N−1) locations corresponding to (N−1) optical connector groups 35 for racks. The label 37 described above may be directly attached to the optical connector 36, or may be attached to the mesh tube between the branch portion 305 and the optical connector group 35 for rack.

Figure 9:
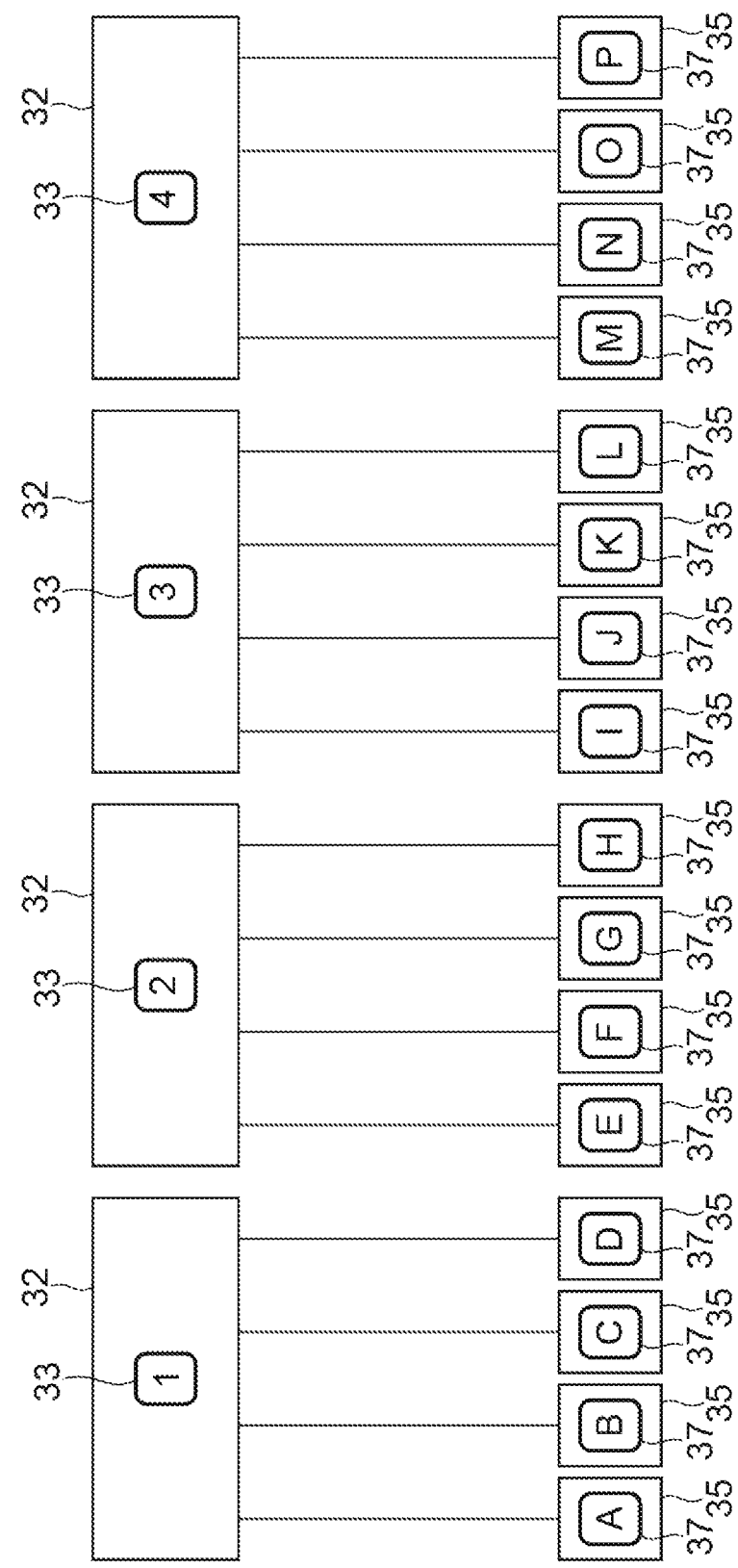
FIG. 9 is a diagram for explaining the correspondence relationship between M optical connectors for distribution frame and N optical connector groups for racks.

FIG. 9 is a diagram for explaining the correspondence relationship between the M optical connectors 32 and the N optical connector groups 35 for racks. Similarly to the working optical fiber cable 20, the closer the label 37 of the optical connector group 35 for rack is to the first number, the closer the label 33 of the corresponding optical connector 32 is to the first number, and the closer the label 37 of the optical connector group 35 for rack is to the last number, the closer the label 33 of the corresponding optical connector 32 is to the last number. That is, the correspondence relationship between the N server racks 11 and the M optical connectors 32 in the spare optical fiber cable 30 is the same as the correspondence relationship between the N server racks 11 and the M optical connectors 22 in the working optical fiber cable 20.

In the present embodiment, the spare distribution frame 50 is arranged on the last server rack 11 side in the arrangement direction of the N server racks 11. Therefore, unlike the working optical fiber cable 20, the closer the label 33 of the optical connector 32 for distribution frame is to the first number "1", the longer the wiring distance from the optical connector group 31 for distribution frame to the corresponding optical connector group 35 for rack in the spare optical fiber cable 30, and the closer the label 33 of the optical connector 32 for distribution frame is to the last number "4", the shorter the wiring distance from the optical connector group 31 for distribution frame to the corresponding optical connector group 35 for rack in the spare optical fiber cable 30. The wiring distances of the four optical connector groups 35 for racks connected to the same optical connector 32 for distribution frame may be the same or different. Typically, as shown in FIG. 7, the closer the label 37 of the optical connector group 35 for rack is to the first number "A", the longer the wiring distance from the optical connector group 31 for distribution frame to the corresponding optical connector group 35 for rack in the spare optical fiber cable 30, and the closer the label 37 of the optical connector group 35 for rack is to the last number "P", the shorter the wiring distance from the optical connector group 31 for distribution frame to the corresponding optical connector group 35 for rack in the spare optical fiber cable 30, unlike the working optical fiber cable 20. That is, the length of the optical fiber between the optical connector group 35 for rack whose label 37 is the first number "A" and the optical connector group 31 for distribution frame is the largest, and the length of the optical fiber between the optical connector group 35 for rack whose label 37 is the last number "P" and the optical connector group 31 for distribution frame is the smallest. In this respect, the configuration of the spare optical fiber cable 30 is different from the configuration of the working optical fiber cable 20. Therefore, in the present embodiment, the configuration of the working optical fiber cable 20 and the configuration of the spare optical fiber cable 30 cannot be made common, but the working optical fiber cable 20 to be used for wiring with the working distribution frame 40 or the spare optical fiber cable 30 to be used for wiring with the spare distribution frame 50 can be easily distinguished.

In the optical communication system 1 of the present embodiment, in the two optical fiber cables (the working optical fiber cable 20 and the spare optical fiber cable 30), the direction of ascending numbering of the optical connector groups 25 and 35 and the direction of ascending numbering of the server racks 11 are the same. In addition, the closer the numbers of the optical connector groups 25 and 35 are to the first number, the closer the numbers of the corresponding optical connectors 22 and 32 are to the first number, and the closer the numbers of the optical connector groups 25 and 35 are to the last number, the closer the numbers of the corresponding optical connectors 22 and 32 are to the last number. With such a configuration, it is possible to easily understand the correspondence relationship between the optical connectors 22 and 32 of the optical fiber cables 20 and 30 and a plurality of server racks 11. Therefore, it is possible to reduce the complexity of connecting the optical fiber cables 20 and 30.

Second Embodiment

Figure 10:
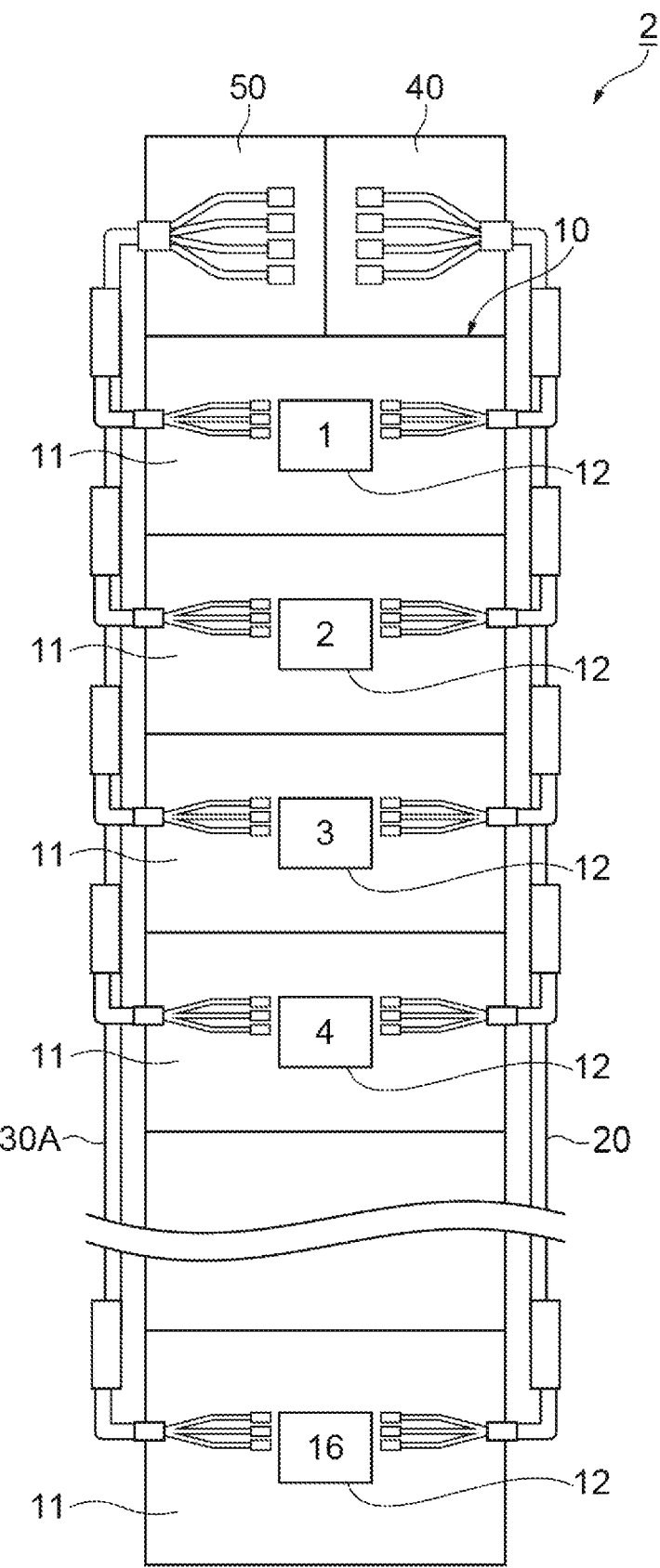
FIG. 10 is a schematic plan view showing a part of the configuration of an optical communication system according to a second embodiment.

FIG. 10 is a schematic plan view showing a part of the configuration of an optical communication system 2 according to a second embodiment. In the optical communication system 2 of the present embodiment, the spare distribution frame 50 is arranged, together with the working distribution frame 40, on a side of the first server rack 11 of the server rack group 10 in the arrangement direction of the N server racks 11. The optical communication system 2 includes a spare optical fiber cable 30A instead of the spare optical fiber cable 30 of the first embodiment. The configuration of the spare optical fiber cable 30A is the same as the configuration of the working optical fiber cable 20 except that M optical connectors for distribution frame are connected to the spare distribution frame 50. Configurations other than these configurations are the same as those of the first embodiment.

Also in the optical communication system 2 of the present embodiment, as in the first embodiment, in the two optical fiber cables (the working optical fiber cable 20 and the spare optical fiber cable 30A), the direction of ascending numbering of the optical connector groups for racks and the direction of ascending numbering of the server racks 11 are the same. In addition, the closer the number of the optical connector group 35 for rack is to the first number, the closer the number of the corresponding optical connector 32 for distribution frame is to the first number, and the closer the number of the optical connector group 35 for rack is to the last number, the closer the number of the corresponding optical connector 32 for distribution frame is to the last number. With such a configuration, it is possible to easily understand the correspondence relationship between the optical connectors for distribution frame of the optical fiber cables 20 and 30A and a plurality of server racks 11. Therefore, it is possible to reduce the complexity of connecting the optical fiber cables 20 and 30A.

The working distribution frame 40 may be arranged, together with the spare distribution frame 50, on a side of the last server rack 11 of the server rack group 10 in the arrangement direction of the N server racks 11. In this case, the optical communication system 2 includes the same spare optical fiber cable 30 as in the first embodiment, and further includes a working optical fiber cable (not shown) having the same configuration as the spare optical fiber cable 30 instead of the working optical fiber cable 20 of the first embodiment. Even in this case, the same effects as those described above can be obtained.

The optical communication system according to the present disclosure is not limited to the embodiments described above, and various modifications can be made. For example, in each of the embodiments described above, the working configuration and the spare configuration may be interchanged. In other words, the direction of ascending numbering of the N server racks 11 and the direction of ascending numbering of the N optical connector groups for racks may be reversed.

In each of the embodiments described above, the server rack, the optical connector group for racks, and the optical connector for distribution frame are numbered with labels attached thereto, but the manner of numbering is not limited thereto.

In each of the embodiments described above, the optical fiber cords included in the working optical fiber cable or the spare optical fiber cable are grouped by the required number in the vicinity of the branch portion by using the mesh tube, but the present disclosure is not limited to this form. For example, the optical fiber cords may be grouped by the required number in the form of a cable covered with a jacket.

What is claimed is:

1. An optical communication system, comprising:
   a server rack group in which N (N is an integer of 2 or more) server racks numbered in ascending order are arranged side by side in order;
   a first distribution frame arranged on a side of a first server rack of the server rack group in an arrangement direction of the N server racks;
   a second distribution frame arranged on a side of a last server rack of the server rack group in the arrangement direction of the N server racks;
   a first optical fiber cable that interconnects the server rack group and the first distribution frame; and
   a second optical fiber cable that interconnects the server rack group and the second distribution frame,
   wherein the first optical fiber cable has an optical connector group for distribution frame including M (M is an integer of 2 or more) optical connectors for distribution frame, which are connected to the first distribution frame and numbered in ascending order, and N optical connector groups for racks each of which includes at least one optical connector for racks, is connected to a device installed in each of the N server racks, and is numbered in ascending order so as to match a direction of numbering of the N server racks,
   the second optical fiber cable has an optical connector group for distribution frame including M optical connectors for distribution frame, which are connected to the second distribution frame and numbered in ascending order, and N optical connector groups for racks each of which includes at least one optical connector for racks, is connected to a device installed in each of the N server racks, and is numbered in ascending order so as to match the direction of numbering of the N server racks,
   in a correspondence relationship between the M optical connectors for distribution frame and the N optical connector groups for racks of the first optical fiber cable and the second optical fiber cable, closer the number of an optical connector group of the N optical connector groups for racks is to a first number, closer the number of a corresponding optical connector of the M optical connectors for distribution frame is to the first number, and closer the number of an optical connector group of the N optical connector groups for racks is to a last number, closer the number of a corresponding optical connector of the M optical connectors for distribution frame is to the last number,
   closer the number of an optical connector of the M optical connectors for distribution frame is to the last number, longer a wiring distance from the optical connector group for distribution frame to a corresponding optical connector group of the N optical connector groups for racks in the first optical fiber cable, and
   closer the number of an optical connector of the M optical connectors for distribution frame is to the last number, shorter a wiring distance from the optical connector group for distribution frame to a corresponding optical connector group of the N optical connector groups for racks in the second optical fiber cable.

2. The optical communication system according to claim 1,
   wherein closer the number of the optical connector group of the N optical connector groups for racks is to the last number, longer the wiring distance from the optical connector group for distribution frame to the optical connector group of the N optical connector groups for racks in the first optical fiber cable, and
   closer the number of the optical connector group of the N optical connector groups for racks is to the last number, shorter the wiring distance from the optical connector group for distribution frame to the optical connector group of the N optical connector groups for racks in the second optical fiber cable.

3. An optical communication system, comprising:
   a server rack group in which N (N is an integer of 2 or more) server racks numbered in ascending order are arranged side by side in order;
   a first distribution frame and a second distribution frame arranged on one side of the server rack group in an arrangement direction of the N server racks;
   a first optical fiber cable that interconnects the server rack group and the first distribution frame; and
   a second optical fiber cable that interconnects the server rack group and the second distribution frame,
   wherein the first optical fiber cable has an optical connector group for distribution frame including M (M is an integer of 2 or more) optical connectors for distribution frame, which are connected to the first distribution frame and numbered in ascending order, and N optical connector groups for racks each of which includes at least one optical connector for racks, is connected to a device installed in each of the N server racks, and is numbered in ascending order so as to match a direction of numbering of the N server racks,
   the second optical fiber cable has an optical connector group for distribution frame including M optical connectors for distribution frame, which are connected to the second distribution frame and numbered in ascending order, and N optical connector groups for racks each of which includes at least one optical connector for racks, is connected to a device installed in each of the N server racks, and is numbered in ascending order so as to match the direction of numbering of the N server racks, in a correspondence relationship between the M optical connectors for distribution frame and the N optical connector groups for racks of the first optical fiber cable and the second optical fiber cable, closer the number of an optical connector group of the N optical connector groups for racks is to a first number, closer the number of a corresponding optical connector of the M optical connectors for distribution frame is to the first number, and closer the number of an optical connector group of the N optical connector groups for racks is to a last number, closer the number of a corresponding optical connector of the M optical connectors for distribution frame is to the last number, and closer the number of an optical connector of the M optical connectors for distribution frame is to the last number, longer a wiring distance from the optical connector group for distribution frame to a corresponding optical connector group of the N optical connector groups for racks in the first optical fiber cable and the second optical fiber cable, or closer the number of an optical connector of the M optical connectors for distribution frame is to the last number, shorter the wiring distance from the optical connector group for distribution frame to a corresponding optical connector group of the N optical connector groups for racks in the first optical fiber cable and the second optical fiber cable.

4. The optical communication system according to claim 3, wherein closer the number of the optical connector of the M optical connectors for distribution frame is to the last number, longer the wiring distance from the optical connector group for distribution frame to the optical connector group of the N optical connector groups for racks in the first optical fiber cable and the second optical fiber cable, and wherein closer the number of the optical connector group of the N optical connector groups for racks is to the last number, longer the wiring distance from the optical connector group for distribution frame to the optical connector group of the N optical connector groups for racks in the first optical fiber cable and the second optical fiber cable.

5. The optical communication system according to claim 3, wherein closer the number of the optical connector of the M optical connectors for distribution frame is to the last number, shorter the wiring distance from the optical connector group for distribution frame to the optical connector group of the N optical connector groups for racks in the first optical fiber cable and the second optical fiber cable, and wherein closer the number of the optical connector group of the N optical connector groups for racks is to the last number, shorter the wiring distance from the optical connector group for distribution frame to the optical connector group of the N optical connector groups for racks in the first optical fiber cable and the second optical fiber cable.

6. The optical communication system according to claim 1, wherein the first optical fiber cable is a working optical fiber cable, and the second optical fiber cable is a spare optical fiber cable.

7. The optical communication system according to claim 3, wherein the first optical fiber cable is a working optical fiber cable, and the second optical fiber cable is a spare optical fiber cable.

8. The optical communication system according to claim 1, wherein each of the N optical connector groups for racks is numbered with a label attached thereto.

9. The optical communication system according to claim 3, wherein each of the N optical connector groups for racks is numbered with a label attached thereto.

10. The optical communication system according to claim 1, wherein each of the M optical connectors for distribution frame is numbered with a label attached thereto.

11. The optical communication system according to claim 3, wherein each of the M optical connectors for distribution frame is numbered with a label attached thereto.

12. The optical communication system according to claim 1, wherein each of the M optical connectors for distribution frame is numbered with a label attached to a reinforcing tube extending from each of the M optical connectors for distribution frame.

13. The optical communication system according to claim 3, wherein each of the M optical connectors for distribution frame is numbered with a label attached to a reinforcing tube extending from each of the M optical connectors for distribution frame.

* * * * *